US012748044B2

(12) United States Patent
Fujimoto

(10) Patent No.: US 12,748,044 B2
(45) Date of Patent: Sep. 29, 2026

(54) GAS SENSOR

(71) Applicant: Asahi Kasei Microdevices Corporation, Tokyo (JP)

(72) Inventor: Yoshinobu Fujimoto, Tokyo (JP)

(73) Assignee: Ashai Kasei Microdevices Corporation, Tokyo (JP)

( * ) Notice: Subject to any disclaimer, the term of this patent is extended or adjusted under 35 U.S.C. 154(b) by 170 days.

(21) Appl. No.: 18/895,383

(22) Filed: Sep. 25, 2024

(65) Prior Publication Data

US 2025/0102427 A1 Mar. 27, 2025

(30) Foreign Application Priority Data

Sep. 26, 2023 (JP) ................................ 2023-163940
Aug. 13, 2024 (JP) ................................ 2024-135051

(51) Int. Cl.
*G01N 21/3504* (2014.01)

(52) U.S. Cl.
CPC ................................ *G01N 21/3504* (2013.01)

(58) Field of Classification Search
CPC ................................................ G01N 21/3504
See application file for complete search history.

(56) References Cited

U.S. PATENT DOCUMENTS

2016/0231244 A1 8/2016 Camargo et al.
2018/0182927 A1 6/2018 Vampola et al.
2019/0242817 A1 8/2019 Gorny
2019/0296193 A1 9/2019 Vampola et al.
2023/0134457 A1 5/2023 Fujita et al.

FOREIGN PATENT DOCUMENTS

EP 3179233 A1 6/2017
EP 3051274 B1 * 10/2018 ......... G01N 21/3504
JP 2004207911 A 7/2004
JP 2015068697 A 4/2015
JP 2017026547 A * 2/2017
JP 2019174354 A 10/2019
JP 2020503679 A 1/2020
JP 2023066369 A 5/2023
WO 2016021495 A1 2/2016

* cited by examiner

*Primary Examiner* — Casey Bryant
(74) *Attorney, Agent, or Firm* — KENJA IP LAW PC

(57) ABSTRACT

A gas sensor is provided in which size of a filter can be decreased and optical path design is facilitated. The gas sensor includes: a light source (20) that has an active layer; a first sensor (32) disposed so that light emitted from the light source is incident thereon, configured to detect a state of a space; a second sensor (31) disposed so that light emitted from the light source is incident thereon, used to compensate for temperature variation or elapsed time variation of the first sensor; a first wavelength limiter configured to limit wavelengths of light emitted from the active layer that reach the first sensor and the second sensor, connected to the light source without the space intervening; and a second wavelength limiter configured to limit wavelengths of light emitted from the active layer that reach the second sensor, connected to the second sensor without the space intervening.

17 Claims, 4 Drawing Sheets

GAS SENSOR

CROSS-REFERENCE TO RELATED APPLICATION

The present application claims priority to and the benefit of Japanese Patent Application No. 2023-163940 filed Sep. 26, 2023, and Japanese Patent Application No. 2024-135051 filed Aug. 13, 2024, the entire contents of which are incorporated herein by reference.

TECHNICAL FIELD

The present disclosure relates to gas sensors.

BACKGROUND

Light sources are used in many applications, such as in indoor or interior lighting, optical devices, and the like. Optical devices use light sources that emit light of specific wavelengths, and include, for example, sterilization devices using ultraviolet light and distance measuring devices using reflected light. Also known are light receiving/emitting devices that combine a light source and a light-receiver (sensor) to detect a state of a space between the light source and the light-receiver. An example of a light receiving/emitting device is a gas sensor that uses infrared light and detects, as detection of a state of a space, concentration of a gas to be detected in a gas body introduced into the space. There is a demand for further improvement in precision of gas sensors. For example, Patent Literature (PTL) 1 describes a non-dispersive infrared (NDIR) gas concentration detection device configured to be calibrated to account for variations in output properties.

CITATION LIST

Patent Literature

PTL 1: WO 2016/021495 A1

SUMMARY

Technical Problem

Here, the gas concentration detection device (gas sensor) of PTL 1 includes a first bandpass filter and a second bandpass filter used for calibration. In recent years, there has been a demand for further miniaturization of gas sensors. Simply decreasing the size of the filter with the technology of PTL 1 changes optical distance and therefore could make optical path design difficult. Further, problems of filter interference and loss of light arise.

In view of these circumstances, it would be helpful to provide a gas sensor in which the size of the filter can be decreased and optical path design is facilitated.

Solution to Problem (1) A gas sensor according to an embodiment of the present disclosure comprises:

a light source that has an active layer;

a first sensor disposed so that light emitted from the light source is incident thereon, configured to detect a state of a space;

a second sensor disposed so that light emitted from the light source is incident thereon, used to compensate for temperature variation or elapsed time variation of the first sensor;

a first wavelength limiter configured to limit wavelengths of light emitted from the active layer that reach the first sensor and the second sensor, connected to the light source without the space intervening; and a second wavelength limiter configured to limit wavelengths of light emitted from the active layer that reach the second sensor, connected to the second sensor without the space intervening.

(2) The gas sensor according to (1), as an embodiment of the present disclosure, further comprises a third wavelength limiter configured to limit wavelengths of light emitted from the active layer that reach the first sensor, connected to the first sensor without the space intervening.

(3) The gas sensor according to (1), as an embodiment of the present disclosure, wherein the first wavelength limiter is composed of layers of materials having different refractive indices and is part of the light source or a substrate on which the light source is installed.

(4) The gas sensor according to (1), as an embodiment of the present disclosure, wherein the second wavelength limiter is composed of layers of materials having different refractive indices and is part of the second sensor or a substrate on which the second sensor is installed.

(5) The gas sensor according to (2), as an embodiment of the present disclosure, wherein the third wavelength limiter is composed of layers of materials having different refractive indices and is part of the first sensor or a substrate on which the first sensor is installed.

(6) The gas sensor according to (2), (4), or (5), as an embodiment of the present disclosure, wherein the light source has a peak wavelength $\lambda p$ at which light intensity is maximum, and the first wavelength limiter has a maximum transmittance of 5% or less in a wavelength range from $(\lambda p \times 0.6)$ nm to $(\lambda p \times 0.8)$ nm.

(7) The gas sensor according to (1), as an embodiment of the present disclosure, wherein the first wavelength limiter does not transmit light of some wavelengths and is part of the light source or a substrate on which the light source is installed.

(8) The gas sensor according to (1), as an embodiment of the present disclosure, wherein the second wavelength limiter does not transmit light of some wavelengths and is part of the second sensor or a substrate on which the second sensor is installed.

(9) The gas sensor according to (2), as an embodiment of the present disclosure, wherein the third wavelength limiter does not transmit light of some wavelengths and is part of the first sensor or a substrate on which the first sensor is installed.

(10) The gas sensor according to any one of (1) to (5), as an embodiment of the present disclosure, wherein the first wavelength limiter is disposed in an optical path of light emitted from the active layer that reaches the second sensor, up until a substrate on which the light source is installed.

(11) The gas sensor according to any one of (1) to (5), as an embodiment of the present disclosure, wherein the second wavelength limiter is disposed in an optical path of light emitted from the active layer that reaches the second sensor, from a substrate on which the second sensor is installed until the light is incident on the second sensor.

(12) The gas sensor according to (10), as an embodiment of the present disclosure, wherein the wavelength limiter has a reflective structure that reflects light of a specific wavelength.

(13) The gas sensor according to (1), as an embodiment of the present disclosure, further comprising a fourth wavelength limiter configured to limit wavelengths of light emitted from the active layer that reaches the first sensor, connected to a surface of a substrate on which the light source is installed without the space intervening.

(14) The gas sensor according to (13), as an embodiment of the present disclosure, wherein the light source has a peak wavelength λp at which light intensity is maximum, and the fourth wavelength limiter has a maximum transmittance of 5% or less in a wavelength range from (λp×0.6) nm to (λp×0.8) nm.

(15) The gas sensor according to (1), as an embodiment of the present disclosure, further comprising an optical filter disposed on an optical path of light emitted from the active layer that reaches the first sensor.

(16) The gas sensor according to any one of (1) to (5), as an embodiment of the present disclosure, wherein the first sensor has the same composition as the light source.

(17) The gas sensor according to any one of (1) to (5), as an embodiment of the present disclosure, wherein when d is the distance between the first sensor and the light source and T is the thickness of a substrate on which the light source is installed, d/T is in a range from 0.70 to 6.00.

Advantageous Effect

According to the present disclosure, a gas sensor is provided in which the size of the filter can be decreased and optical path design is facilitated.

DETAILED DESCRIPTION

A gas sensor according to an embodiment of the present disclosure is described below, with reference to the drawings. In each drawing, identical or equivalent parts are marked with the same reference sign. In description of the embodiment, description of identical or equivalent parts is omitted or simplified as appropriate.

(Gas Sensor)

Figure 1:
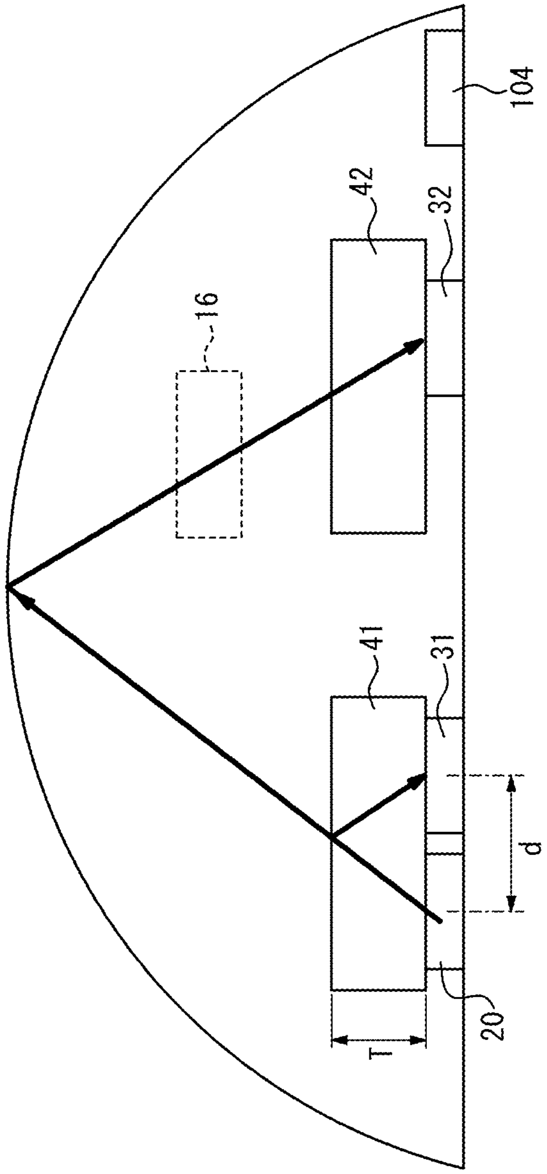
FIG. 1 illustrates an example configuration of a gas sensor according to an embodiment of the present disclosure.

FIG. 1 illustrates a configuration of the gas sensor according to the present embodiment. The gas sensor measures the presence or concentration of a gas to be detected in a gas body. In the example in FIG. 1, the gas sensor includes a gas cell depicted as a semicircle. Here, the gas sensor is not limited to the configuration illustrated in FIG. 1, and a gas cell of a shape other than a semicircle, for example, may be employed. Further, although an inner surface of the gas cell is a reflective surface in the example in FIG. 1, a gas cell may be employed whose inner surface is not reflective. When a gas body is introduced into the internal space of the gas cell, the gas sensor measures the presence or concentration of a gas to be detected in the introduced gas body. The gas sensor according to the present embodiment is an NDIR gas sensor. The gas sensor according to the present embodiment is applicable to various types of equipment. For example, the gas sensor can be used for environmental measurement in buildings, mounting on portable communication devices such as smart phones as a small portable measurement device, detecting gas concentrations in the interior of vehicles such as automobiles, trains, or airplanes, and the like.

Further, according to the configuration of the gas sensor, the gas sensor is applicable as a light receiving/emitting device for applications other than gas sensing. That is, disclosure content derived by replacing "gas sensor" as described above with "light receiving/emitting device", "optical device", "optical concentration measuring device", "optical physical quantity measuring device", or the like is included in the scope of the present disclosure. For example, the state of an optical path space external to a substrate can be detected (examples other than gas include the presence or absence or concentration of a specific component of a fluid). For example, the disclosure content can be used for a component detection device or a component concentration measuring device for a substance (for example, water or a body fluid) present in an optical path space between a light source 20 and a first sensor 32. For example, when the substance present in the optical path space is blood, the component detection device or the component concentration measuring device can be used to measure glucose concentration in blood.

The component detection device or the component concentration measuring device can measure glucose concentration in blood sugar by measuring absorption of light having a wavelength of 1 μm to 10 μm. In the measurement of glucose concentration in blood sugar, measuring absorption of light at 1.6 μm, 2.0 μm to 2.3 μm, and 9.6 μm is preferred. A compact, high precision, and highly reliable non-invasive glucose concentration meter can be realized. Such a glucose concentration meter allows, for example, a diabetic patient to self-check blood sugar levels with good precision and without causing damage to the skin as would occur with an invasive method. Further, more accurate administration of medication (for example, insulin) can be achieved, based on the blood sugar levels checked.

The gas sensor includes the light source 20, a second sensor 31, and a wavelength limiter. Further, the gas sensor may include a first substrate 41, a second substrate 42, and the first sensor 32. The wavelength limiter is a functional part that limits the wavelengths of light reaching the second sensor 31 and may be, for example, part of the light source 20 or the substrate on which the light source 20 is installed (first substrate 41), as described below. FIG. 1 illustrates a cross-section view of the gas sensor including these components. Details of the components of the gas sensor are described below.

Here, as in FIG. 1, the gas sensor may further include an optical filter 16. Further, the gas sensor may further include an arithmetic unit 104. The optical filter 16 is disposed on an optical path of light emitted from the light source 20 that reaches the first sensor 32, and limits a transmitted wavelength band of light. The optical filter 16 may be, for example, a bandpass filter of a known configuration. The arithmetic unit 104 may comprise a processor or the like that calculates concentration of a gas to be detected using output signals from the second sensor 31 and the first sensor 32. A known method may be used to calculate the concentration of the gas to be detected.

An overview of the configuration of the gas sensor according to the present embodiment is as follows. In the gas sensor, the second sensor 31 and the first sensor 32 are arranged so that light emitted from the light source 20 is incident on the second sensor 31 and the first sensor 32. An inner surface of the gas cell (the surface on the internal space side) reflects light. In FIG. 1, the optical path of light emitted from the light source 20, reflected from the inner surface of the gas cell, and incident on the first sensor 32, is indicated by an arrow. Further, the optical path of a portion of light emitted from the light source 20, reflected at a side of the first substrate 41 (inside a second main surface to be described later), and incident on the second sensor 31, is indicated by an arrow. The gas sensor includes the first substrate 41 that has a first main surface and the second main surface opposite the first main surface, and the light source 20 and the second sensor 31 are on the first main surface. Here, the light source 20 and the second sensor 31 need not be arranged on the same substrate. Further, the gas sensor includes the second substrate 42 that has a first main surface and a second main surface opposite the first main surface, and the first sensor 32 is on the first main surface. A portion of the light emitted from the light source 20 and incident on the first sensor 32 is incident on the second sensor 31. Therefore, even when the light-emitting properties of the light source 20 change due to changes in the use environment or deterioration over time, a detection signal of the second sensor 31 can be used to accurately detect a state of the space by the first sensor 32. That is, the second sensor 31 is used to compensate for temperature changes or changes over time in the first sensor 32 that detects a state of the space. Further, in the example in FIG. 1, light is emitted from a back surface of the first substrate 41 (the surface on which the light source 20 and the like are not located) and light is incident on a back surface of the second substrate 42, but light may be emitted from a front surface and incident on a front surface.

Here, the gas sensor may have the first substrate 41 designed so that the angle of light incident on the second sensor 31 is from 20° to 70°, based on a relationship between emission efficiency of the light source and a reflection amount. More preferably, the first substrate 41 may be designed so that the angle of light incident on the second sensor 31 is from 30° to 60°. In other words, when d is the distance between the second sensor 31 and the light source 20 and T is the thickness of the substrate (first substrate 41) on which the light source 20 is installed, (d/T) is in a range from 0.70 to 6.00, for example. Here, (d/T) may be in a range from 0.72 to 5.50, corresponding to the angle of light described above. More preferably, (d/T) may be in a range from 1.15 to 3.50.

Further, in the gas sensor, the second sensor 31 and the first sensor 32 preferably have the same temperature properties. The term "same temperature properties" does not necessarily mean strict uniformity, but rather that temperature properties are generally uniform. Further, to achieve a high signal-to-noise ratio for the gas sensor as a whole, the areas of the second sensor 31 and the first sensor 32 may be different. Further, the second sensor 31 and the first sensor 32 may each be formed by a number of light-receiving elements.

Here, a detection signal of the second sensor 31 can be used to compensate for temperature changes or changes over time in the first sensor 32, as described above. However, more precise compensation may be required for changes in the emission properties of the light source 20, particularly when the gas sensor is configured to include the optical filter 16. For example, when the second sensor 31 receives almost all wavelengths of light from the light source 20, a change in the amount of light received (integrated intensity) by the second sensor 31 is small before and after a wavelength shift (change in wavelength distribution) occurs at the light source 20. In contrast, in the first sensor 32, which receives only light of a specific wavelength due to the optical filter 16, the amount of light received (integrated intensity) changes significantly when a wavelength shift (change in wavelength distribution) occurs at the light source 20. In such a case, the relationship between the amount of light received by the second sensor 31 and the amount of light received by the first sensor 32 may deviate from a true value, resulting in insufficient compensation and making it impossible to provide a high precision gas sensor. A solution to this problem is to provide a filter member similar to the optical filter 16 to the second sensor 31, so that both the second sensor 31 and the first sensor 32 are configured to receive only light of a specific wavelength. However, there is a demand for further miniaturization of gas sensors. When a filter similar to the optical filter 16 is disposed on the optical path of light incident on the second sensor 31, the size of the gas sensor increases. Further, miniaturization of the filter causes problems of filter interference and light loss, making optical path design difficult. The gas sensor according to the present embodiment can reduce the size of the filter and facilitate optical path design by inclusion of a wavelength limiter, as described below.

(Light Source)

Components of the gas sensor are described in detail below. The light source 20 emits light that contains wavelengths absorbed by a gas to be detected. As the light source 20, examples include a lamp, a light-emitting diode (LED), a micro-electromechanical systems (MEMS) emitter, light amplification by stimulated emission of radiation (laser), and the like. According to the present embodiment, the light source 20 is an LED and includes an active layer 53 (see FIG. 2). Here, the active layer 53 is the layer in which photoelectric conversion takes place, and is the light-emitting layer in the LED and the light-receiving layer in a sensor.

The light source 20 preferably has a stacked structure of a PN junction or a PIN junction deposited using a deposition method such as molecular beam epitaxy (MBE) or chemical vapor deposition (CVD). By supplying electrical power to the stacked structure, operation as an LED and emission of light having a wavelength corresponding to the band gap of the material of the stacked structure become possible. The active layer 53 contains In or Sb, which makes it possible to emit infrared light. Specifically, by using InSb, InAlSb, or InAsSb in the active layer 53, light having a wavelength from 1 μm to 12 μm can be output.

(Second Sensor)

The second sensor 31 receives light (infrared rays) and outputs a signal corresponding to the amount of light received. As the second sensor 31, examples include a photodiode, a photoconductor, a thermopile, a pyroelectric sensor, and the like. From the viewpoint of response speed of signal processing, the second sensor 31 may be a PN junction or a PIN junction diode structure and may contain indium or antimony as a material. The second sensor 31 may further include a mixed crystal material containing at least one material selected from the group consisting of Ga, Al, and As. Further, from the viewpoint of aligning temperature properties or wavelength properties, the material and stacked structure of the second sensor 31 is preferably the same as the material and stacked structure of the light source 20. According to the present embodiment, the second sensor 31 is a photodiode including the active layer 53, having the same configuration as the light source 20.

(First Substrate)

The first substrate 41 has the light source 20 and the second sensor 31 on the first main surface. The material of the first substrate 41 is not particularly limited. The material of the first substrate 41 may be, but is not limited to, Si, GaAs, sapphire, InP, InAs, Ge, or the like, and may be selected according to the wavelength band to be used. From the viewpoint of easily electrically insulating the second sensor 31 and the light source 20, a semi-insulating substrate is preferably used as the material of the first substrate 41. From the viewpoint of being able to achieve a large diameter, the material of the first substrate 41 is particularly preferably a GaAs substrate. From the viewpoint of improving measurement sensitivity, the material of the first substrate 41 preferably has high transmittance for light emitted from the light source 20. Further, from the viewpoint of compensating for output variation of the light source 20 with high precision, the material of the first substrate 41 is preferably a material that efficiently reflects light emitted from the light source 20 at the second main surface. The first substrate 41 may suppress the transmission of light on the shorter wavelength side than the peak wavelength at which the intensity of the light emitted from the light source 20 is maximum. This allows efficient measurement while maintaining a small size.

(First Sensor)

The first sensor 32 receives light (infrared rays) and outputs a signal corresponding to the amount of light received. As the first sensor 32, examples include a photodiode, a photoconductor, a thermopile, a pyroelectric sensor, and the like. From the viewpoint of response speed of signal processing, the first sensor 32 may be a PN junction or a PIN junction diode structure and may contain indium or antimony as a material. The first sensor 32 may further include a mixed crystal material containing at least one material selected from the group consisting of Ga, Al, and As. The material and stacked structure of the first sensor 32 is preferably the same as the material and stacked structure of the light source 20.

According to the present embodiment, from the viewpoint of improving measurement sensitivity, the optical filter 16 is described as transmitting only a specific wavelength band and is provided in the optical path of light emitted from the second main surface of the first substrate 41 to the light being incident on the first sensor 32. However, the optical filter 16 is not required and is optional.

(Second Substrate)

The second substrate 42 has the first sensor 32 on the first main surface. Light incident on the second main surface side is transmitted through the second substrate 42 and is incident on the first sensor 32. The material of the second substrate 42 is not particularly limited. The material of the second substrate 42 may be, but is not limited to, Si, GaAs, sapphire, InP, InAs, Ge, or the like, and may be selected according to the wavelength band to be used. From the viewpoint of improving measurement sensitivity, the material of the second substrate 42 preferably has high transmittance for light incident on the second main surface side.

(Wavelength Limiter)

The wavelength limiter limits wavelengths of light emitted from the active layer 53 of the light source 20 that reach the second sensor 31, and is connected to the light source 20 without any space intervening. The connection between the wavelength limiter and the light source 20 includes both direct connection and indirect connection as long as no space intervenes, and also includes the wavelength limiter being in the light source 20. Here, "without any space intervening" may mean without the space in which the object to be measured is located (for example, gas space). For example, the existence of a space with no object to be measured between the wavelength limiter and the light source 20 may be included in the scope of "without any space intervening". The wavelength limiter has a filter function similar to that of the optical filter 16, so that both the second sensor 31 and the first sensor 32 receive only light of a specific wavelength. The wavelength limiter is not limited to a specific configuration and may be realized by any of the configurations described below, for example.

Figure 2:
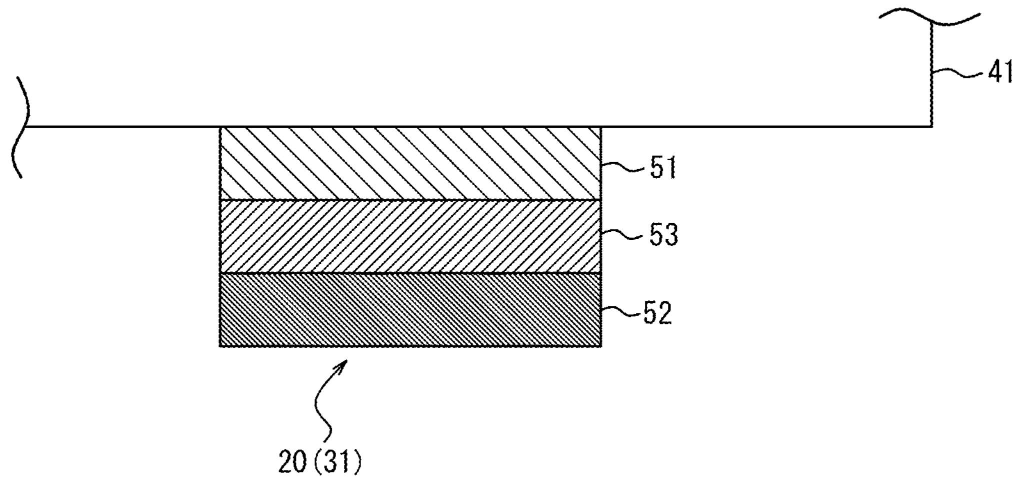
FIG. 2 illustrates an example configuration of a wavelength limiter.

As illustrated in FIG. 2, the wavelength limiter is composed of layers of materials having different refractive indices and may be part of the light source 20. The light source 20 includes a first layer 51, a second layer 52, and the active layer 53, where at least the first layer 51 corresponds to the wavelength limiter. That is, in the example in FIG. 2, the wavelength limiter is disposed in an optical path of light emitted from the active layer 53 that reaches the second sensor 31, up until the first substrate 41. The first layer 51 is a layer on the first main surface side of the first substrate 41 that transmits only light of a specific wavelength, similar to the optical filter 16, for example by means of a resonance structure (distributed Bragg reflector (DBR)). Therefore, the second sensor 31 can only receive light of a specific wavelength. Here, the second layer 52 may be, for example, a resonance structure (DBR) having layers of different refractive indices in a stack. Further, the second layer 52 may be a layer of metal that reflects light. In such a case, the wavelength limiter is configured to have a reflective structure that reflects light of specific wavelengths by combining the first layer 51, which is a resonance structure, with the second layer 52, which is a metal layer. When the wavelength limiter is part of the light source 20, the second sensor 31 may likewise be configured to include a wavelength limiter. Further, for the first layer 51 and the active layer 53, the same wavelengths of light can be used, and therefore it is desirable to include a similar wavelength limiter. Further, the wavelength band limited by the optical filter 16 is not particularly limited, but the wavelength distribution of light transmitted through the optical filter 16 is preferably narrower than the wavelength distribution of light transmitted through the wavelength limiter, in order to decrease the effect of large variation in the wavelength distribution of light. The gas sensor may be equipped with a plurality of wavelength limiters. Wavelength limiters of different configurations may be referred to, for example, as a first wavelength limiter, a second wavelength limiter, a third wavelength limiter, or a fourth wavelength limiter, to distinguish them. For example, the first wavelength limiter may be disposed between the light source 20 and the first substrate 41. For example, the second wavelength limiter may be disposed between the second sensor 31 and the first substrate 41. For example, the third wavelength limiter may be disposed between the first sensor 32 and the second substrate 42. For example, the fourth wavelength limiter may be disposed between a space and the first substrate 41 (or the second substrate 42). That is, the fourth wavelength limiter may be configured to be connected to the front surface of a substrate. Further, for example, the first wavelength limiter and the fourth wavelength limiter may each have a maximum transmittance of 5% or less in a wavelength range from (λp×0.6) nm to (λp×0.8) nm. The light source 20 has a peak wavelength at which light intensity is maximum, and the peak wavelength is λp.

Figure 3A:
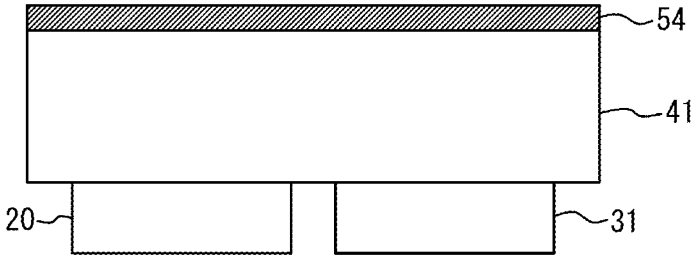
FIG. 3A illustrates an example configuration of a wavelength limiter.
Figure 3B:
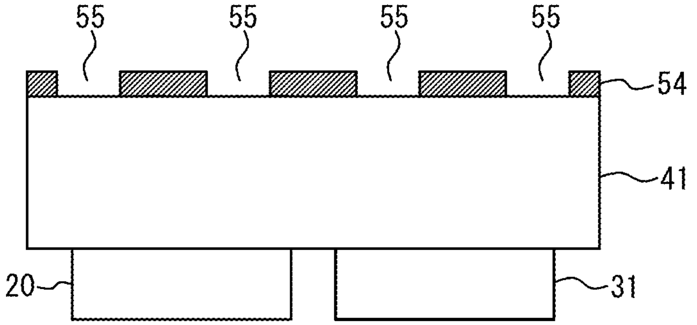
FIG. 3B illustrates an example configuration of a wavelength limiter.
Figure 3C:
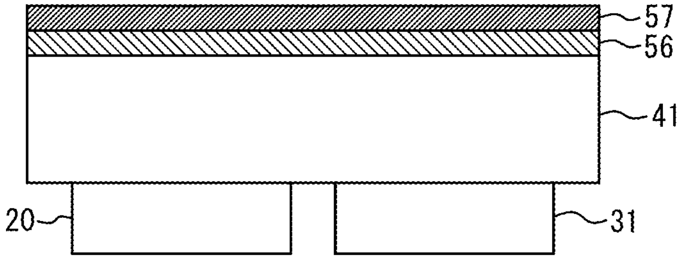
FIG. 3C illustrates an example configuration of a wavelength limiter.

As illustrated in FIG. 3A to FIG. 3C, the wavelength limiter may be part of a substrate and cause only light of a specific wavelength to be reflected to the second sensor 31. In the examples in FIG. 3A and FIG. 3B, a specific wavelength reflective layer 54 corresponds to the wavelength limiter. The specific wavelength reflective layer 54 has a resonance structure similar to the example in FIG. 2. The specific wavelength reflective layer 54 can suppress the transmission of light on the shorter wavelength side than the peak wavelength at which the intensity of light emitted from the light source 20 is maximum. Here, the specific wavelength reflective layer 54 in the example in FIG. 3A has the properties of a half mirror 57, transmitting some light to the first sensor 32 and reflecting some light to the second sensor 31. The specific wavelength reflective layer 54 in the example of FIG. 3B has apertures 55, and light passing through the apertures 55 is directed to the first sensor 32. Light reflected by the specific wavelength reflective layer 54 is directed to the second sensor 31. In the example in FIG. 3C, the wavelength limiter consists of a layer of the half mirror 57 and a layer of a filter 56. Only light of a specific wavelength is transmitted by the filter 56, and the half mirror 57 transmits some light to the first sensor 32 and reflects some light to the second sensor 31. Further, the wavelength limiter may be configured to include a dichroic mirror.

Figure 4A:
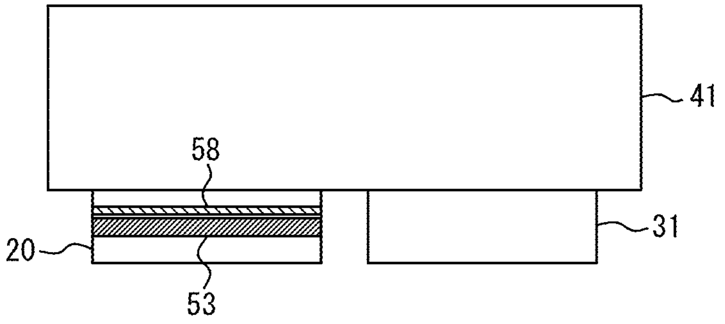
FIG. 4A illustrates an example configuration of a wavelength limiter.
Figure 4B:
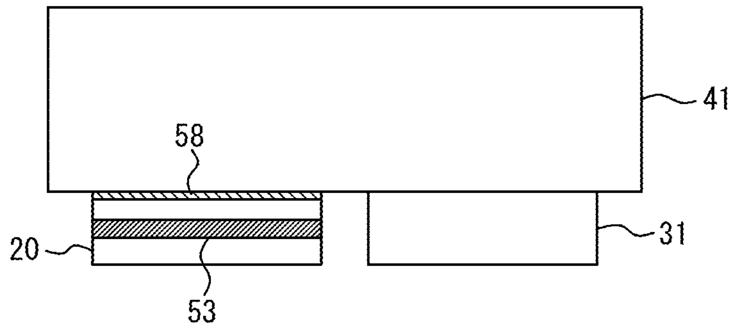
FIG. 4B illustrates an example configuration of a wavelength limiter.

As illustrated in FIG. 4A and FIG. 4B, the wavelength limiter may include an absorbing layer 58. The absorbing layer 58 absorbs light of some wavelengths (light of wavelengths that are not the "specific wavelength" mentioned above) so as not to transmit the light. The material of the absorbing layer 58 is selected according to the wavelength to be absorbed. For example, Si, GaAs, GaInAsP, or the like may be used as the material of the absorbing layer 58 when light having a wavelength of 1 μm or less or 2 μm or less is to be absorbed. From the viewpoint of ease of film deposition, use of GaAs is preferred. Further, from the viewpoint of insulation, the absorbing layer 58 may be structured to include an oxidized layer. For example, AlInAsSb may be used as the material of the absorbing layer 58 when light having a wavelength of 6 μm or more is to be absorbed, and use of InSb is more preferred. From the viewpoint of increasing absorption, the absorbing layer 58 preferably contains a dopant such as Si, Sn, or the like. From the viewpoint of increasing light intensity, some of the absorbing layer 58 may be a void. The void changes the direction of light travel, and light may be reflected several times inside the absorbing layer in a direction parallel to the plane of the substrate before being emitted into the space. The materials listed as materials for the absorbing layer 58 may be used in combination as appropriate. The absorbing layer 58 may be part of the light source 20 or the first substrate 41. As illustrated in FIG. 4A as a specific example, the absorbing layer 58 may be disposed inside the light source 20 in close proximity to the active layer 53. As illustrated in FIG. 4B, the absorbing layer 58 may be disposed inside the light source 20 in contact with the first substrate 41. The light source 20 is preferably configured so that the light intensity at a wavelength of light emitted from the light source 20 that is not absorbed by the wavelength limiter is greater than the light intensity at wavelengths of light absorbed by the wavelength limiter.

As described above, the gas sensor according to the present embodiment, according to the configuration described above, allows the filter for light incident on the second sensor 31 to be realized by the wavelength limiter, thereby decreasing size of the gas sensor. Further, in the gas sensor according to the present embodiment, the filter for light incident on the second sensor 31 can be configured as part of the light source 20 or a substrate (the first substrate 41), which also facilitates optical path design.

(Method of Measuring Refractive Indices)

The refractive indices of the first layer and the second layer can be measured by an ellipsometer in accordance with "JIS K7142".

(Method of Measuring Transmittance of Optical Filter)

The transmittance of the optical filter can be measured by an FT-IR microscope (Hyperion 3000+TENSOR 27, produced by Bruker Corporation).

Although embodiments of the present disclosure have been described based on the drawings and examples, it should be noted that a person skilled in the art may make variations and modifications based on the present disclosure. Therefore, it should be noted that such variations and modifications are included within the scope of the present disclosure.

Further, the configurations of the wavelength limiter described above can be combined as long as they are not mutually exclusive combinations. For example, the gas sensor may be configured to include the first layer 51 of the light source 20 as illustrated in FIG. 2 and the specific wavelength reflective layer 54 as illustrated in FIG. 3A, with the first layer 51 and the specific wavelength reflective layer 54 serving as the wavelength limiter.

The invention claimed is:

1. A gas sensor comprising:

a light source that has an active layer;

a first sensor disposed so that light emitted from the light source is incident thereon, configured to detect a state of a space;

a second sensor disposed so that light emitted from the light source is incident thereon, used to compensate for temperature variation or elapsed time variation of the first sensor;

a first wavelength limiter configured to limit wavelengths of light emitted from the active layer that reach the first sensor and the second sensor, connected to the light source without the space intervening; and a second wavelength limiter configured to limit wavelengths of light emitted from the active layer that reach the second sensor, connected to the second sensor without the space intervening.

2. The gas sensor according to claim 1, further comprising a third wavelength limiter configured to limit wavelengths of light emitted from the active layer that reach the first sensor, connected to the first sensor without the space intervening.

3. The gas sensor according to claim 2, wherein the third wavelength limiter is composed of layers of materials having different refractive indices and is part of the first sensor or a substrate on which the first sensor is installed.

4. The gas sensor according to claim 2, wherein the light source has a peak wavelength λp at which light intensity is maximum, and the first wavelength limiter has a maximum transmittance of 5% or less in a wavelength range from (λp×0.6) nm to (λp×0.8) nm.

5. The gas sensor according to claim 2, wherein the third wavelength limiter does not transmit light of some wavelengths and is part of the first sensor or a substrate on which the first sensor is installed.

6. The gas sensor according to claim 1, wherein the first wavelength limiter is composed of layers of materials having different refractive indices and is part of the light source or a substrate on which the light source is installed.

7. The gas sensor according to claim 1, wherein the second wavelength limiter is composed of layers of materials having different refractive indices and is part of the second sensor or a substrate on which the second sensor is installed.

8. The gas sensor according to claim 1, wherein the first wavelength limiter does not transmit light of some wavelengths and is part of the light source or a substrate on which the light source is installed.

9. The gas sensor according to claim 1, wherein the second wavelength limiter does not transmit light of some wavelengths and is part of the second sensor or a substrate on which the second sensor is installed.

10. The gas sensor according to claim 1, wherein the first wavelength limiter is disposed in an optical path of light emitted from the active layer that reaches the second sensor, up until a substrate on which the light source is installed.

11. The gas sensor according to claim 10, wherein the wavelength limiter has a reflective structure that reflects light of a specific wavelength.

12. The gas sensor according to claim 1, wherein the second wavelength limiter is disposed in an optical path of light emitted from the active layer that reaches the second sensor, from a substrate on which the second sensor is installed until the light is incident on the second sensor.

13. The gas sensor according to claim 1, further comprising a fourth wavelength limiter configured to limit wavelengths of light emitted from the active layer that reaches the first sensor, connected to a surface of a substrate on which the light source is installed without the space intervening.

14. The gas sensor according to claim 13, wherein the light source has a peak wavelength λp at which light intensity is maximum, and the fourth wavelength limiter has a maximum transmittance of 5% or less in a wavelength range from (λp×0.6) nm to (λp×0.8) nm.

15. The gas sensor according to claim 1, further comprising an optical filter disposed on an optical path of light emitted from the active layer that reaches the first sensor.

16. The gas sensor according to claim 1, wherein the first sensor has the same composition as the light source.

17. The gas sensor according to claim 1, wherein when d is the distance between the first sensor and the light source and T is the thickness of a substrate on which the light source is installed, d/T is in a range from 0.70 to 6.00.

* * * * *